(12) United States Patent
Kidd

(10) Patent No.: US 7,140,760 B2
(45) Date of Patent: Nov. 28, 2006

(54) WIRE RETENTION FEATURE

(75) Inventor: R. Andrew Kidd, Alexandria, IN (US)

(73) Assignee: Guide Corporation, Pendleton, IN (US)

( * ) Notice: Subject to any disclaimer, the term of this patent is extended or adjusted under 35 U.S.C. 154(b) by 208 days.

(21) Appl. No.: 10/918,680

(22) Filed: Aug. 13, 2004

(65) Prior Publication Data

US 2006/0034095 A1    Feb. 16, 2006

(51) Int. Cl.
   *F21S 8/10*     (2006.01)
   *F21V 17/08*    (2006.01)

(52) U.S. Cl. ............ 362/549; 362/545; 362/548; 362/546; 362/374

(58) Field of Classification Search ........... 362/549, 362/548, 546, 362, 364, 374, 375, 396, 457, 362/544, 540, 541, 542, 545, 249, 449, 523, 362/285, 287; 248/313, 316.1; 439/36
See application file for complete search history.

(56) References Cited

U.S. PATENT DOCUMENTS 6,715,909 B1 *    4/2004    Serizawa .................. 362/545

\* cited by examiner

*Primary Examiner*—Alan Cariaso
*Assistant Examiner*—Bao Q. Truong
(74) *Attorney, Agent, or Firm*—Ice Miller LLP

(57) ABSTRACT

The subject invention relates to automotive lighting assemblies. Specifically, the subject invention relates to a device and method for retaining wires, which provide power to the light source, in the proper orientation. In an exemplary embodiment, a wire retaining cavity is formed by a molded rib on a cover and a molded retention feature with a hook portion on a light source retaining compartment. In this exemplary embodiment, the cover and retaining compartment are integrally connected to one another by a living hinge. The wire retaining cavity is formed once the cover is folded over the retaining cavity bringing the rib into close proximity of the wire retention feature and adjacent to the hook portion of the feature.

22 Claims, 7 Drawing Sheets

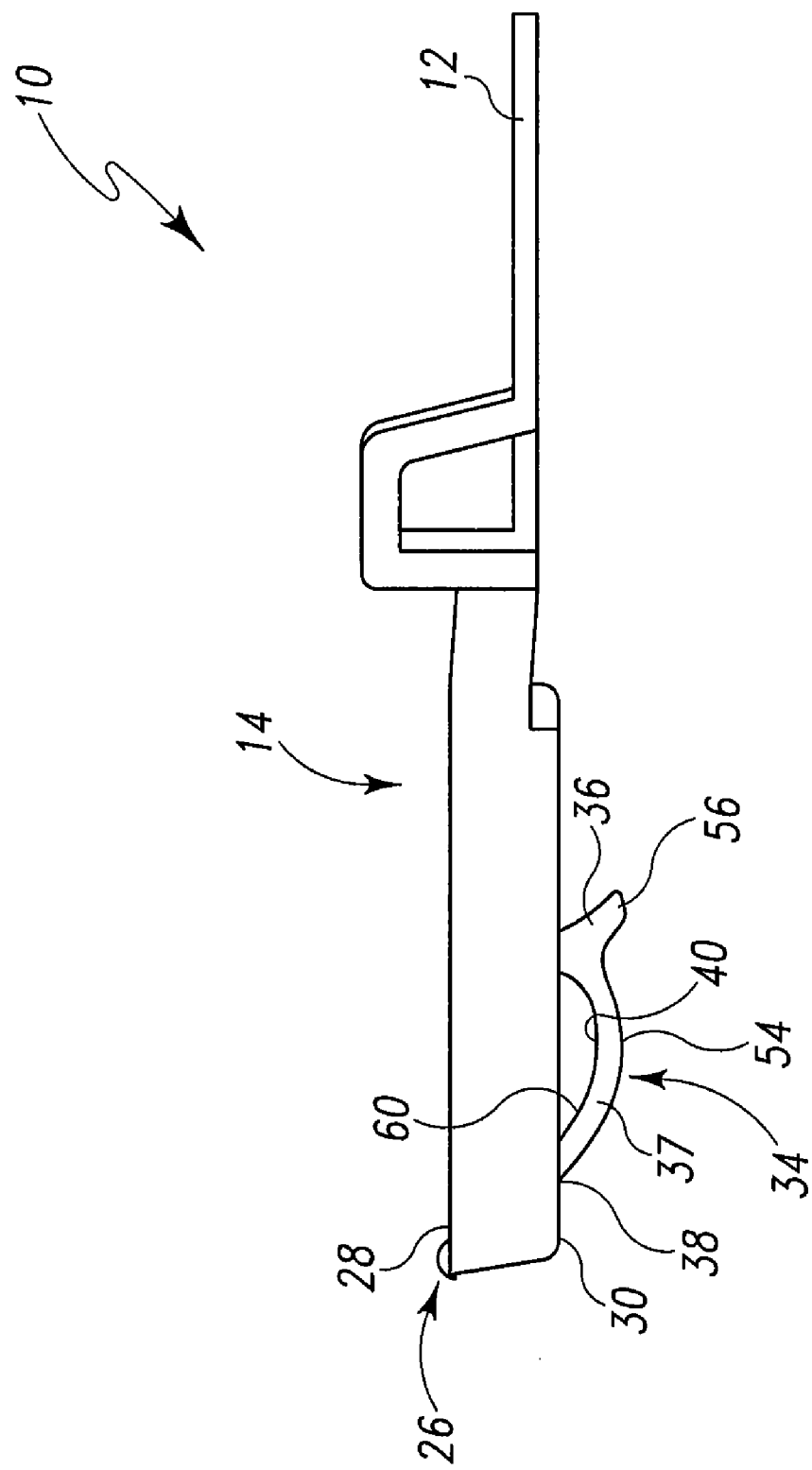

WIRE RETENTION FEATURE

BACKGROUND OF INVENTION

The subject invention relates to automotive lighting assemblies. Specifically, the subject invention relates to a device and method for retaining wires, which provide power to the light source, in the proper orientation.

In order for an automotive lighting assembly to be assembled into an automobile, the lighting assembly must fit within a small defined space that is specifically designed for that automobile's automotive lighting assembly. Consequently, the automotive lighting assembly must be as compact as possible. For this reason, it is important to ensure that the wires leading into the automotive lighting assembly do not occupy a significant amount of space, while still ensuring that the wires are in the proper orientation to supply power to the lighting assembly. To accomplish these goals, usually the wires are clipped or taped to the lamp housing prior to installation of the lighting assembly. The disadvantage in using a clip or tape, or other similar attachment device, is that it increases the number of parts needed to construct the lighting assembly, which in turn increases the manufacturing cost and time involved in producing these assemblies. Accordingly, what is needed is a means for retaining the wires in the proper orientation without increasing the number of parts needed to manufacture the lighting assembly.

BRIEF INVENTION SUMMARY

There are various embodiments that fall within the scope of the subject invention. For example, one embodiment comprises an automotive lamp assembly having a light source retaining compartment. The retaining compartment has at least one access opening, at least one retention opening, and at least one integral retention feature that has at least one hook portion that extends into the retention opening. The retaining compartment is pivotally connected to a cover, so that the cover can be pivoted to cover the access opening of the retaining compartment. The cover has at least one molded rib located on the interior of the cover in a position, such that the rib is adjacent to the at least one hook portion of the retention feature when the cover is pivoted to cover the access opening. In this manner, this embodiment forms at least one wire retention cavity between the at least one rib and the at least one hook portion. This embodiment could also have the cover and retaining compartment integrally connected to one another by a living hinge, so that the cover can fold over the living hinge in order to cover the retaining compartment and form the wire retaining cavity. Further, the retaining compartment can be an LED retaining compartment that contains an LED array.

In another embodiment, the molded wire retention feature for the lamp housing has a base integral with and attached to the lamp housing and a first side, a second side, a third side, a fourth side, and a top edge that are all detached from the lamp housing. The top edge of this feature is substantially parallel to and located opposite the base. The hook portion of the retaining feature is located on the first side near the top edge. Further, the second and third sides of this embodiment are located opposite each other, substantially parallel to one another and substantially perpendicular to the first side and fourth side.

The retention feature also has at least one arch contour adjacent to the hook portion and located on the first side in between the base and top edge of the retention feature. This retention feature can be located on an LED retaining compartment and can be placed in close proximity to a molded rib located on the interior of the cover in order to form the wire retaining cavity. At least one wire can be placed under the hook portion into the arch contour so that the wire is held in the proper alignment in the wire retaining cavity by the arch contour, hook portion and molded rib. Moreover, the cover and LED retaining compartment of this embodiment can be pivotally and integrally attached to one another by a living hinge, so that once the cover is folded over the living hinge the molded rib will be placed in close proximity with the wire retention feature and form the wire retaining cavity.

In another embodiment, the automotive lamp assembly has a light source retaining compartment with at least one wire retention feature integrally formed at one end to an interior wall of said compartment and extending into an opening through one of the walls of the retaining compartment. A hook portion is located on an edge of the retention feature opposite the end integrally formed to the interior wall. A cover is integrally and pivotally connected to the LED retaining compartment by a living hinge. At least one rib is located on the interior of the cover and positioned to form a wire retention cavity once the cover is folded over the living hinge to cover the access opening in the retaining compartment. In either of these embodiments, a retaining rib can also be molded on the fourth side of the retention feature. The fourth side is the side opposite and substantially parallel to the first side.

Thus, these embodiments of the invention can reduce the number of parts and amount of time needed to retain and properly align at least one wire in the lamp assembly. During the assembly process, the wire retention cavity is formed by placing the cover over the access opening of the light source retaining compartment, so that the at least one rib is in close proximity with the hook portion of the at least one wire retention feature to form a wire retaining cavity. After the wire retaining cavity is formed, at least one wire can be inserted into the at least one wire retention cavity by sliding the at least one wire underneath the hook portion of the at least one retention feature. In this embodiment, the at least one wire retention feature pivots about its base that is integral to the lamp housing to allow the at least one wire to slide underneath the hook portion. After the at least one wire is inserted, the wire is properly aligned and retained by the retaining cavity. The wires can only be removed if the at least one retention feature is raised enough, by pivoting about the base, for the wires to be removed under the hook portion.

BRIEF DESCRIPTION OF THE DRAWINGS

The advantages of the subject invention, the manner of obtaining them, and the invention itself will become more apparent and better understood by reference to the following description of the embodiments of the invention taken in conjunction with the accompanying drawings, wherein:

FIG. 3 is an end view of the closed lamp housing of FIG. 1;

Corresponding reference characters indicate corresponding parts throughout the several views.

DETAILED DESCRIPTION OF THE INVENTION

Figure 1:
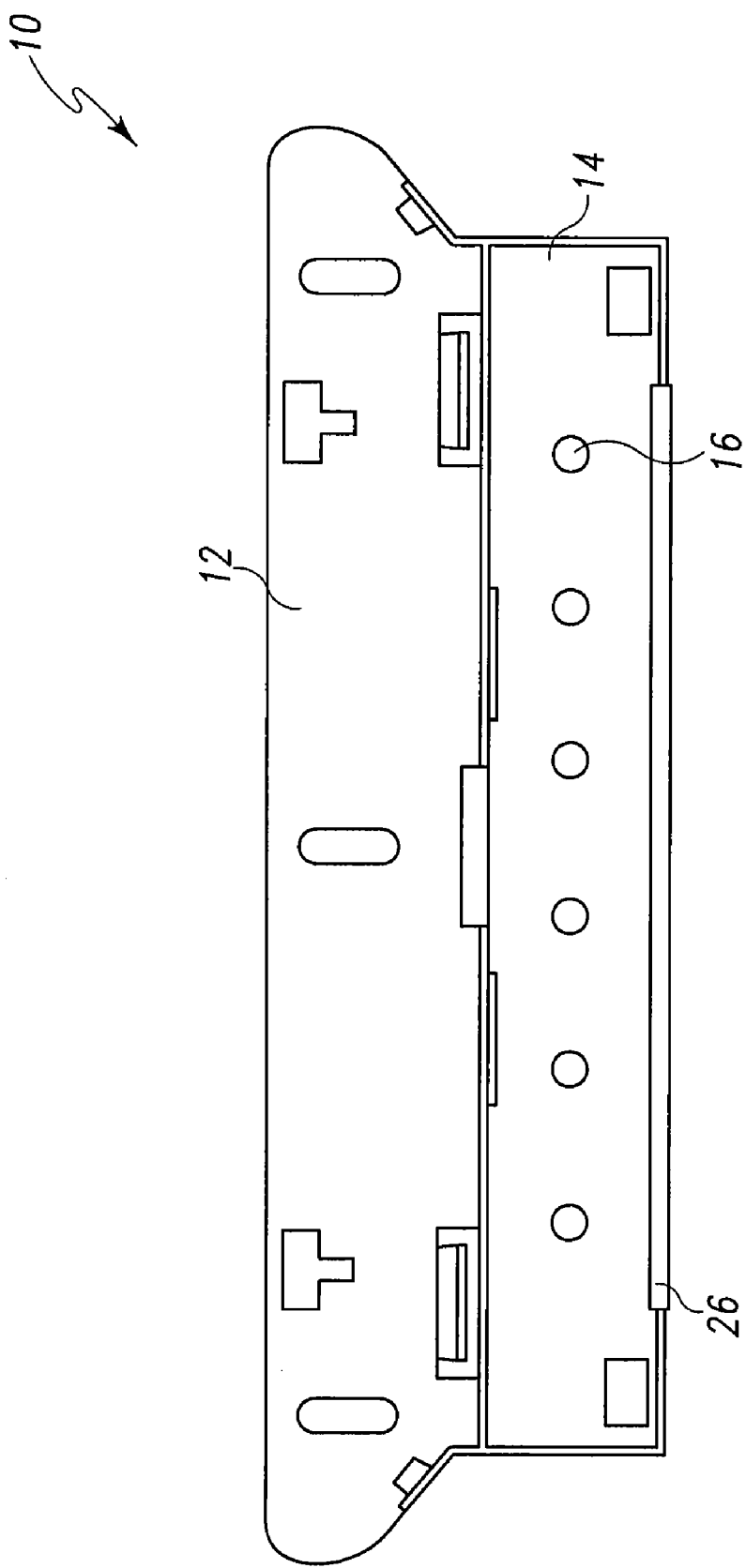
FIG. 1 is a top view of a closed lamp housing of an exemplary embodiment of the subject invention.

FIG. 1 shows a top view of an exemplary embodiment of the subject invention. As shown in FIG. 1, the exemplary embodiment comprises a light emitting diode ("LED") automotive lamp assembly 10 for a center high-mounted stop lamp ("CHMSL"). While the subject invention is described in relation to this CHMSL lighting assembly embodiment, it will be appreciated that this is just an example and the subject invention can be utilized with any number of other lighting assemblies.

Referring to FIG. 1, lighting assembly 10 has a mounting plate 12 and a lamp housing 14 that contains an LED array (not pictured). Lamp housing 14 has LED receiving holes 16 that allow the light emitting portion of the LED array to extend and emit light out of the lamp housing.

Figure 2:
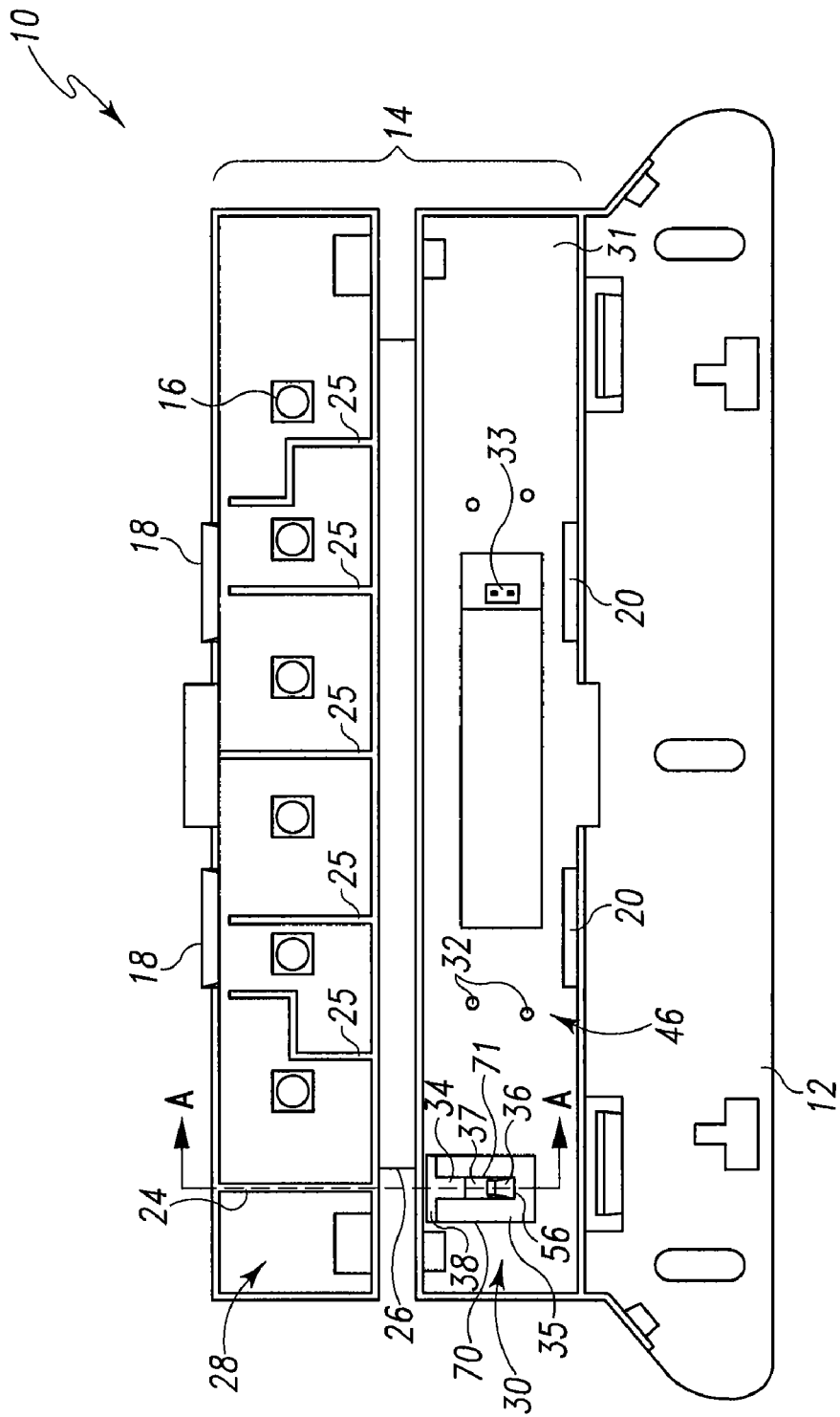
FIG. 2 is a top view of the lamp housing of FIG. 1 opened.

FIG. 2 shows a top view of lamp housing 14 with its LED cover 28 opened. As shown in FIG. 2, lamp housing 14 comprises a cover 28 integral with and pivotally attached by a living hinge 26 to a LED retaining compartment 30 with an access opening 46. As used herein, the term "living hinge" refers to a flexible piece of molded plastic that is molded simultaneously and is integral with two separate pieces. In this case, the living hinge 26 is molded simultaneously with the LED retaining compartment 30 and cover 28. While the retaining compartment 30 in this embodiment is a LED retaining compartment, any type of light source retaining compartment can be used. Further, while access opening of this embodiment spans the entire length of the retaining compartment, the access does not have to provide a full opening to the retaining compartment, but rather, can be a partial opening into the retaining compartment.

Living hinge 26 allows the cover 28 to fold over the living hinge so that the cover covers the access opening 46 of retaining compartment 30. Cover 28 also has two locking tabs 18 that snap into two corresponding receiving slots 20 of compartment 30 in order to lock cover 28 in its closed position. While FIG. 2 shows lamp assembly 10 with two locking tabs 18 and two corresponding receiving slots 20, lamp assembly 10 can have any number of locking tabs and corresponding receiving slots.

Figure 6:
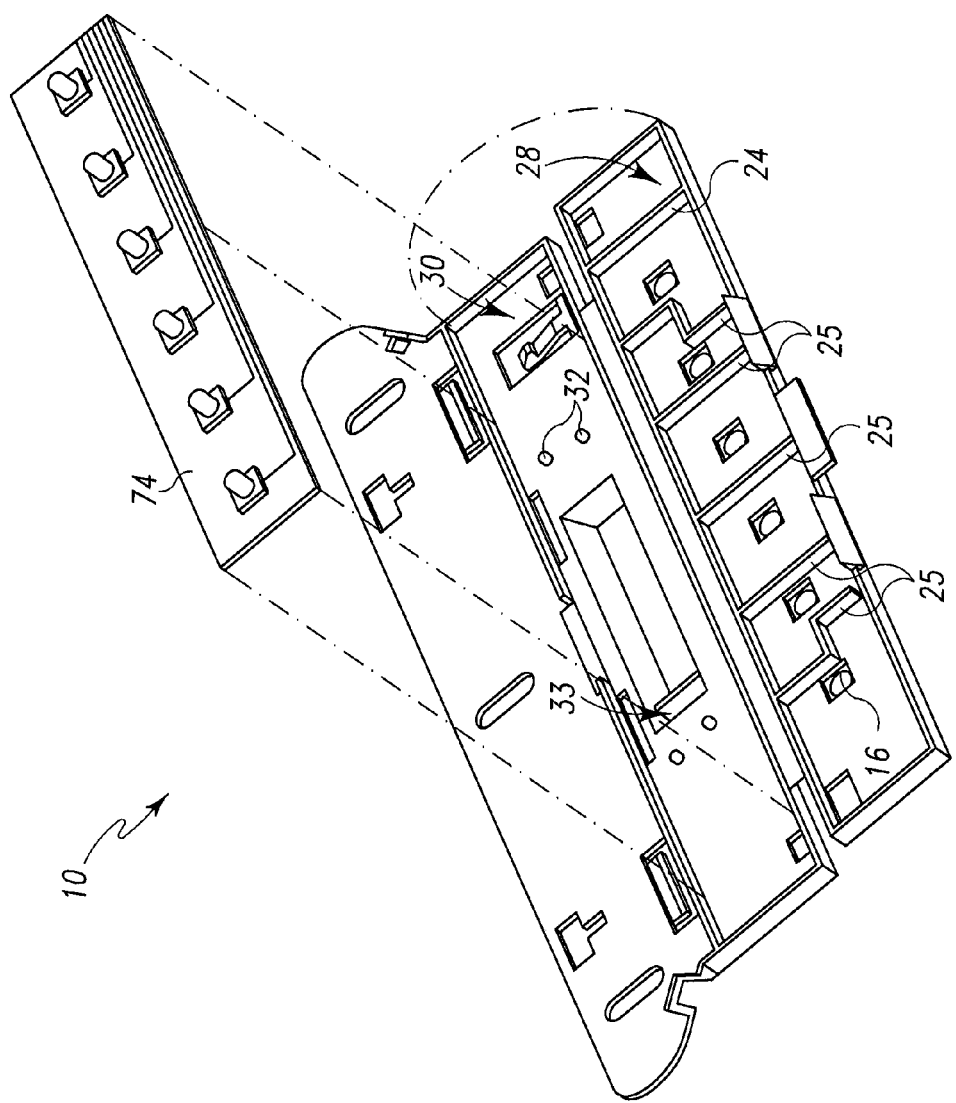
FIG. 6 is a exploded perspective view of the lamp housing of FIG. 1.

FIG. 6 shows an exploded perspective view of lighting assembly 10 with an LED array 74. During assembly, the LED array 74 is placed on the LED retaining compartment's floor 31 on top of molded support posts 32. Cover 28 is then folded over living hinge 26 to cover the LED retaining compartment 30 and LED array. As shown in FIGS. 2 and 6, cover 28 has a plurality of molded support ribs 25 that set on top of the LED array to hold the array in place once the locking tabs 18 lock into receiving slots 20. The LED array is electrically connected to a power source by means well known in the art, such as plugging terminals into a wire outlet 33. As already explained, the light emitting portions of the LED array fit through LED receiving holes 16 so that the light emitting portions can emit light out of the lamp housing 14.

Still referring to FIG. 2, LED retaining compartment 30 also has a wire retention feature 34. Wire retention feature 34 is molded at the same time as lamp housing 14 and has a base 38 that is integral and attached to floor 31 of LED retaining compartment 30 The remaining sides of wire retention feature 34 (top edge 56 located opposite base 38, side 54 that faces away from the retention compartment 30, side 60 that faces the retention compartment 30, and sides 70 and 71 that run the length of the wire retention feature and are opposite and substantially parallel to one another) are not attached to anything, so that the retention feature can flex/pivot about its base 38. Wire retention feature 34 extends into an opening 35 in floor 31 of retaining compartment 30. FIG. 3 shows an edge view of the closed lamp housing 14. As shown in FIG. 3, retention feature 34 has an arch contour 37 that protrudes from LED retaining compartment 30 through opening 35.

Referring to both FIGS. 2 and 3, retention feature 34 has a hook portion 36 located near the retention feature's top edge 56 on its compartment facing side 60. Further, retention feature 34 has arch contour 37 adjacent to the hook portion 36 positioned in between base 38 and hook portion 36. By lifting up on hook portion 36, retention feature 34 pivots and/or flexes about base 38 as the hook portion is raised. After this force is removed, the retention feature will spring back to its original position.

Figure 4A:
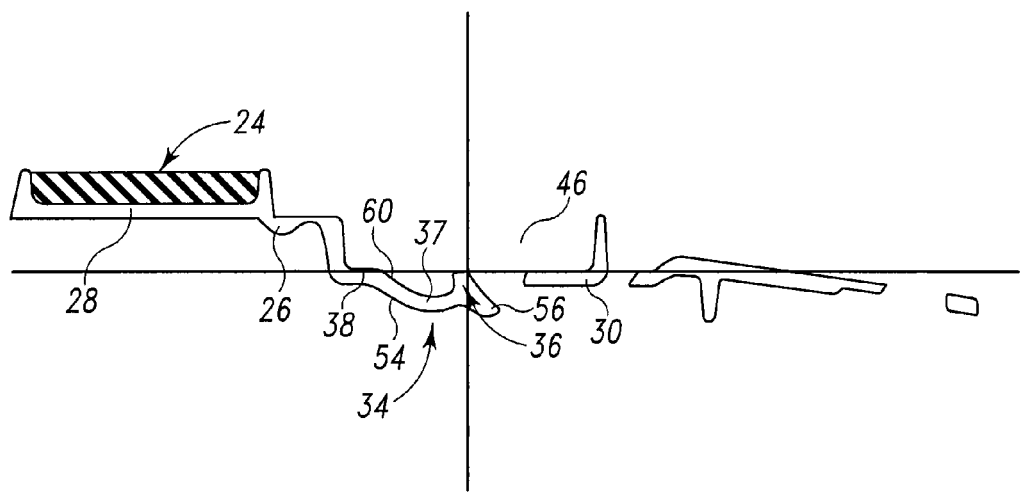
FIG. 4a is a cross-sectional view of the open lamp housing along line A—A of FIG. 2.
Figure 4B:
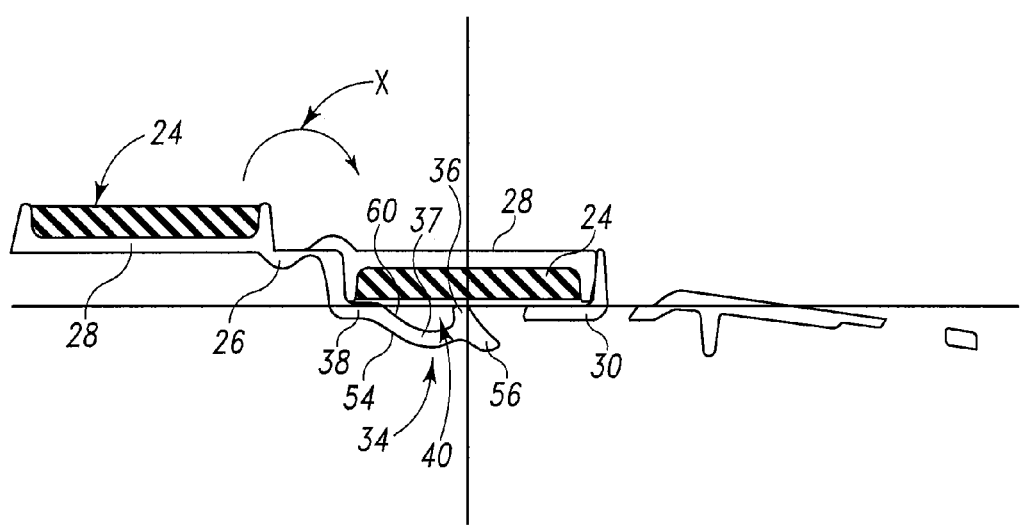
FIG. 4b is a cross-sectional view along line A—A of FIG. 2 of the open lamp housing being closed.

Referring back to FIG. 2, retention feature 34 is aligned with a molded rib 24 on the inside of cover 28 so that when cover 28 is folded across living hinge 26 and locked into place covering compartment 30, hook portion 36 will be in close proximity to rib 24. Rib 24 is a molded, raised piece of plastic that is integral with cover 28. FIG. 4a shows a cross-sectional view of lamp housing 14 along line A—A of FIG. 2. As shown in FIG. 4a, rib 24 is located on cover 28 in a position that corresponds to the location of wire retention feature 34. Once cover 28 covers retention compartment 30, hook portion 36 will be adjacent to and in close proximity with rib 24 and will form a wire retention cavity 40. FIG. 4b shows the cross-sectional view of lamp housing 14 as cover 28 is folded over living hinge 26. As shown in FIG. 4b, cover 28 folds over living hinge 26 in the direction of arrow x in order to cover and enclose compartment 30. In cover's 28 closed position, rib 24 will be placed in close proximity to wire retention feature 34, arch contour 37 and hook portion 36 to form wire retention cavity 40.

Figure 5:
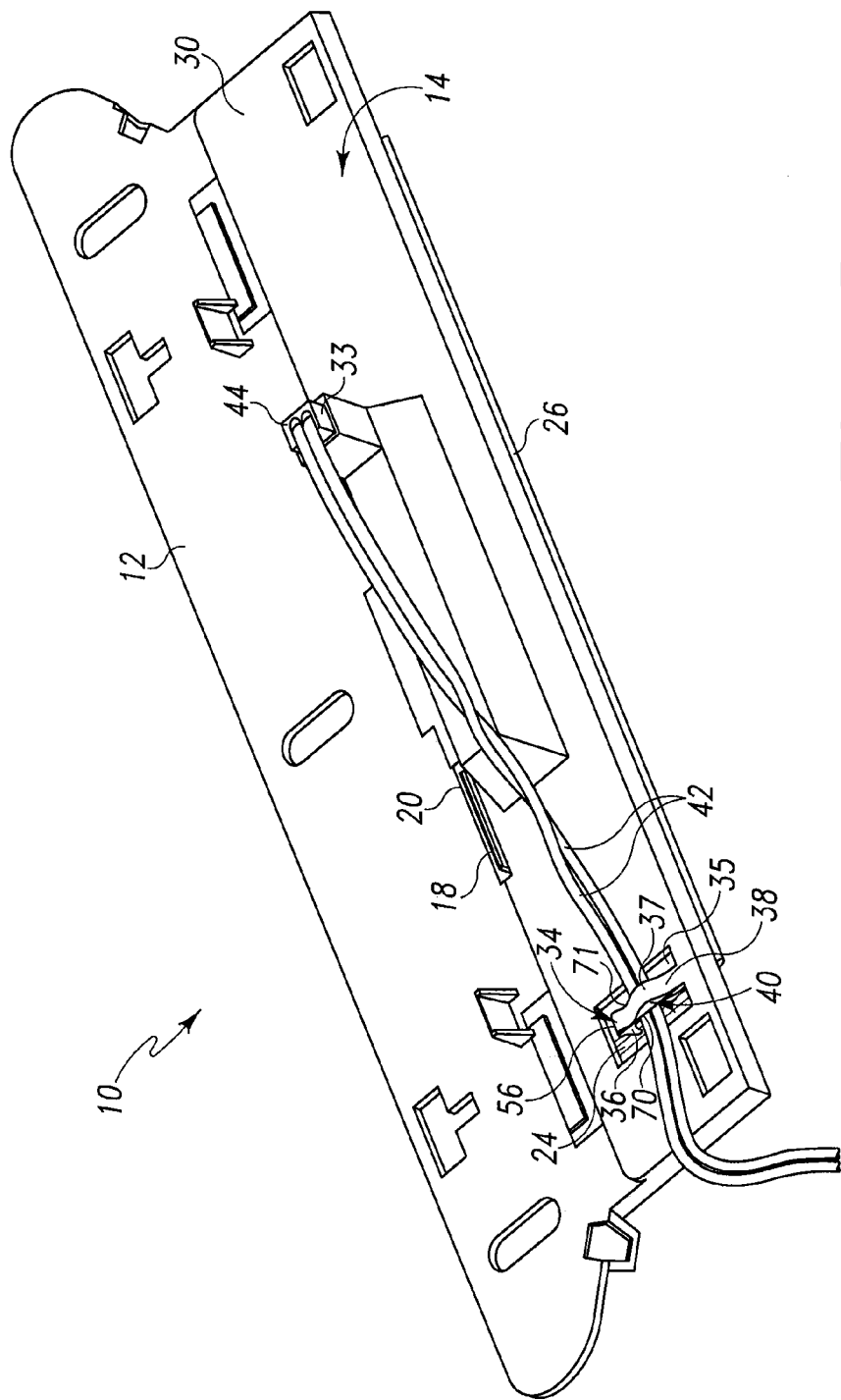
FIG. 5 is a bottom view of the closed lamp housing of FIG. 1.

FIG. 5 shows a bottom view of lamp assembly 10. As shown in FIG. 5, lamp assembly 10 has wires that are electrically connected to and extend from wire outlet 33. In order to properly align the wires with the lamp housing 14, the wires are placed underneath retention feature 34 into wire retaining cavity 40 by sliding the wires underneath hook portion 36. By sliding the wires into wire retaining cavity 40, the need for clips, tape, or other similar parts to hold wires 40 in place is eliminated.

Thus, during the assembly process, lamp assembly 10 is molded so that it has cover 28 with molded rib 24, LED retaining compartment 30 with wire retention feature 36 molded out the back of the retaining compartment, and living hinge 26 that connects the cover and retaining compartment together. After the lamp assembly is molded, an LED array (not pictured) is inserted into retaining compartment 30. Cover 28 is then folded over living hinge 26 to cover the access opening 46 of the retaining compartment 30 so that rib 24 and wire retention feature 34 are placed adjacent to one another (shown in FIG. 4b). This close proximity of rib 24 and wire retention feature 34 causes the hook portion 36, arch contour 37 and rib 24 to form wire retaining cavity 40 (shown in FIG. 4b). A wire outlet 33 with wires 42 electrically connected to the outlet is inserted into a receiving slot 44 in LED retaining compartment 30 (shown in FIG. 5) in order to electrically connect the LED array to wire outlet 33 by means well known in the art (i.e., terminals being plugged into the outlet 33). Wires 42 can be slid under hook portion 36 so that the wires fit into the arch contour 37 and wire retaining cavity 40. (shown in FIG. 5).

The angle of hook portion 36 and only base 38 being attached to LED retaining compartment allows for easy insertion of the wires. As the wires are slid under the hook portion 36, the angle of the hook portion will cause the wire retention feature 34 to flex/pivot about base 38 in order to allow the wires to pass into wire retaining cavity 40. After wires 42 are inserted into the wire retaining cavity 40, arch contour 37, hook portion 36 and rib 24 will prevent the wires 42 from coming loose and falling out of alignment. The wires can still be removed by physically lifting up on hook portion 36 until the wire retention feature flexes about base 38 enough to allow the wires to be removed from the retaining cavity 40.

Referring to FIG. 5, wires 32 are relatively long and are usually bundled together by some type of tape prior to the lamp assembly being mounted in the automobile. During this mounting process, it is customary for the assembly line workers to pull on the wires to unbundled them and rip the tape holding them together. The wire retention feature 34 ensures that stress caused by this pulling of the wires is placed on the wire retention feature and not the electrical connection between the outlet 33 and the terminals of the LED array. This ensures that the electrical connection is protected from damage by pulling on the wires.

Figure 4C:
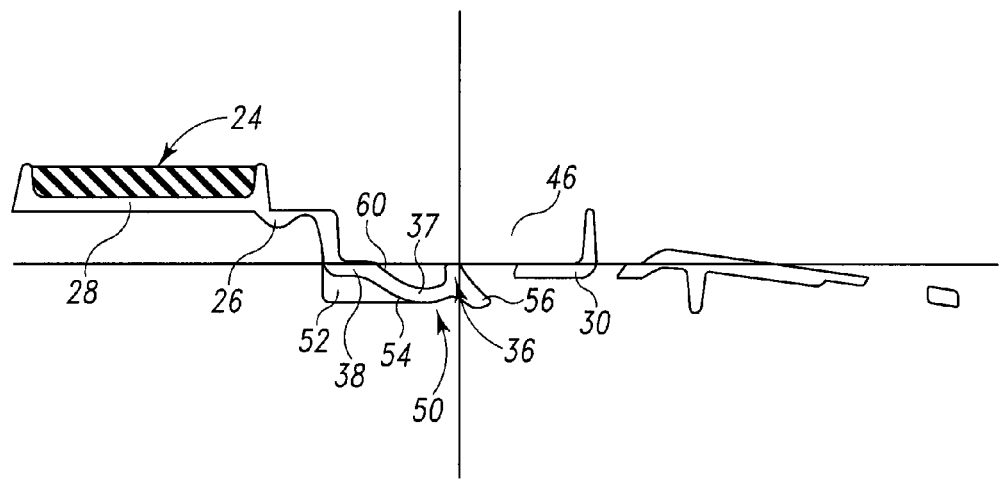
FIG. 4c is a cross-sectional view along line A—A of FIG. 2 of the open lamp housing utilizing a second embodiment of the wire retention feature.
Figure 4D:
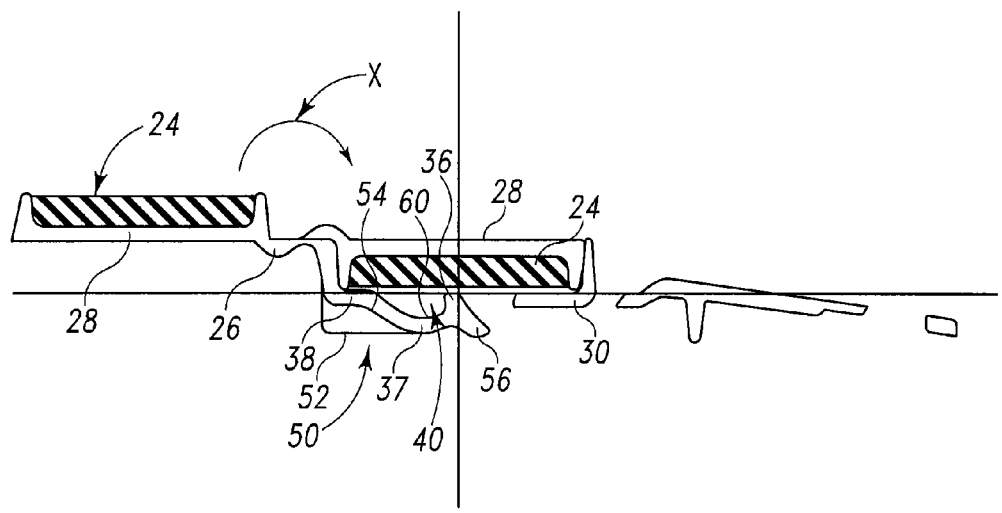
FIG. 4d is a cross-sectional view along line A—A of FIG. 2 of the open lamp housing of FIG. 4c being closed.

FIGS. 4c and 4d shows another embodiment of the wire retention feature 50. FIG. 4c is a cross-sectional view along line A—A of FIG. 2 of the open lamp housing utilizing a second embodiment of the wire retention feature. FIG. 4d is a cross-sectional view along line A—A of FIG. 2 of the open lamp housing of FIG. 4c being closed. As shown in FIGS. 4c and 4d, wire retention feature 50 differs from wire retention feature 34 only in that it is also molded with a reinforcing rib 52 on its side 54 facing away from retention compartment 30. Reinforcing rib 52 stiffens the wire retention feature 50 so that it will not flex/pivot about base 38 as easily. Rib 52 will also strengthen the wire retention feature 50. This helps ensure that the wire retention feature 50 will withstand higher levels of stress placed on the wire retention feature (i.e., when the wires are unbundled) without breaking. Moreover, reinforcing rib 52 will help ensure that the wire retention feature 50 will return to its original position after a force causes the wire retention feature to flex about base 38. This in turn causes the hook portion 36 to remain in close proximity with rib 24.

In this embodiment, reinforcing rib 52 has a width (not shown in FIGS. 4c and 4d) and length that is smaller than the width and length of the side 54 of wire retention feature 50. Moreover, the height of reinforcing rib 52 does not exceed the height of wire retention feature 50. However, reinforcing rib 52 can be any size that still allows the wire retention feature 50 to flex/pivot about base 38.

The molded rib 24, the living hinge 26 and the retention feature 34/50 reduce the number of parts and amount of time needed to assemble a lamp assembly, such as the CHMSL LED lamp assembly 10 disclosed herein, by eliminating the need to use additional clips or tape to align the wires. While a lamp assembly that utilizes one wire retention feature 34 and one molded rib 24 is disclosed herein, lamp assemblies of different varieties, including the disclosed embodiment, can utilize any number of wire retention features and molded ribs to create several wire retaining cavities. Further, while FIG. 5 shows two wires 42 being retained in wire retaining cavity 40, any number of wires can be retained in such a cavity. Moreover, the wire retention feature can have multiple hook portions and any number of arch contour. It should be further understood that it is not necessary for cover 28 and LED retaining compartment 30 to be joined together by living hinge 26. While the living hinge reduces the number of separate pieces and makes the assembly process simpler, it is not necessary to this invention. Further, it is not necessary for the cover 28 to cover the entire LED retaining compartment. The cover can partially cover the retaining compartment or cover the retaining compartment completely.

While the subject invention has been described in considerable detail with references to particular embodiment thereof, such is offered by way of non-limiting examples of the invention as many other versions are possible. For example, the wire retention feature does not have to be utilized with an automotive lamp assembly that utilizes LEDs, but can be utilized with any other light source that would enable one to mold the wire retention feature on the lamp housing in a location to properly retain the wires. While the subject invention may be used with different lamp assemblies, it is anticipated that a variety of other modifications and changes will be apparent to those having ordinary skill in the art and that such modifications and changes are intended to be encompassed within the spirit and scope of the pending claims.

I claim:

1. An automotive lamp assembly comprising:
    a) a light source retaining compartment having at least one access opening, at least one compartment opening and at least one integral wire retention feature having at least one hook portion extending into the compartment opening;
    b) a cover pivotally connected to the retaining compartment so that the cover can be pivoted to cover the at least one access opening; and
    c) at least one rib located on the cover in a position such that the rib is adjacent to the at least one hook portion when the cover is pivoted to cover the access opening, so that at least one wire retention cavity is formed between the at least one rib and the at least one hook portion of the at least one wire retention feature.

2. The automotive lamp assembly of claim 1, wherein the cover is connected to the retaining compartment by at least one living hinge that pivotally and integrally connects the retaining compartment and cover together.

3. The automotive lamp assembly of claim 1, wherein the at least one wire retention feature has a base integral and attached to an interior wall of the retaining compartment, and a top edge located opposite the base, a first side facing the lamp housing, a second and third side opposite and substantially parallel to each other, and a fourth side facing away from the lamp housing, wherein the top edge, the first side, the second side, the third side and the fourth side are all detached from the retaining compartment and wherein the at least one hook portion is located on the first side near the top edge.

4. The automotive lamp assembly of claim 3, wherein the at least one wire retention feature further comprises at least one arch contour positioned adjacent to the at least one hook portion on the first side in between the base and the at least one hook portion.

5. The automotive lamp assembly of claim 4, further comprising at least one wire positioned within the at least one wire retention cavity.

6. The automotive lamp assembly of claim 5, wherein the at least one hook portion, the at least one arch contour and the at least one rib properly align the at least one wire and hold the at least one wire in place.

7. The automotive lamp assembly of claim 1, further comprising at least one light emitting diode array located in the light source retaining compartment.

8. The automotive lamp assembly of claim 3, wherein the wire retention feature further has a molded reinforcing rib positioned on and integral with the fourth side of the wire retention feature.

9. A molded wire retention feature for an automotive lamp housing the wire retention feature comprising:
  a) a base integral with and attached to a lamp housing;
  b) a first, a second, a third, and a fourth side and a top edge detached from the lamp housing, wherein the top edge is located opposite the base, the fourth side is substantially parallel to and located opposite the first side, which faces the lamp housing, and the second and third sides are located opposite each other and substantially parallel to one another and substantially perpendicular to the first and the fourth sides;
  c) at least one arch contour located on the first side in between the base and the top edge; and
  d) at least one hook portion located on the first side near the top edge and positioned adjacent to the at least one arch contour.

10. The wire retention feature of claim 9, wherein the lamp housing comprises an access opening, a compartment opening, a cover for the access opening with at least one rib on an interior side of the cover and a light emitting diode retaining compartment within the housing.

11. The wire retention feature of claim 10, wherein the wire retention feature extends into said compartment opening.

12. The wire retention feature of claim 11, wherein the wire retention feature is positioned on the light emitting diode retaining compartment so that the at least one hook portion is in close proximity with the at least one rib to form a wire retaining cavity when the cover covers the access opening.

13. The wire retention feature of claim 12, further comprising at least one wire positioned within the wire retaining cavity.

14. The wire retention feature of claim 9, further comprising a molded reinforcing rib positioned on and integral with the fourth side of the wire retention feature.

15. An automotive lamp assembly comprising:
  a) a light source retaining compartment with at least one wire retention feature integrally formed at a first end of an interior wall of said compartment and extending into an opening through a second wall of the retaining compartment;
  b) a hook portion located on a second end of the retention feature opposite the first end integrally formed to the interior wall;
  c) a cover integrally and pivotally connected to the light source retaining compartment by a living hinge; and
  d) at least one rib located on the cover and positioned in close proximity with the hook portion to form a wire retention cavity once the cover is folded over the living hinge to cover the access opening in the retaining compartment.

16. The automotive lamp assembly of claim 15, further comprising at least one wire positioned within the at least one wire retention cavity.

17. The automotive lamp assembly of claim 16, wherein the at least one hook portion and the at least one rib properly align the at least one wire and hold the at least one wire in place.

18. The automotive lamp assembly of claim 15, further comprising an light emitting diode array located in the light source compartment.

19. The automotive lamp assembly of claim 15, wherein the at least one wire retention feature further has a molded reinforcing rib located on and integral with a side opposite the hook portion.

20. A method of retaining and properly aligning wires on a lamp assembly, the method comprising the steps of:
  a) providing a lamp assembly with a light source retaining compartment and an access opening with at least one retention feature having a base attached to and integral with the retaining compartment, a first side facing the retaining compartment, a second side and a third side substantially parallel to each other, a fourth side opposite the first side, and a top edge opposite the base, wherein the first side, the second side, the third side, the fourth side and the top edge are detached from the retaining compartment, and wherein a hook portion is positioned on the first side;
  b) providing a cover for the access opening having at least one rib;
  c) forming at least one wire retention cavity by placing the cover over the access opening to the retaining compartment so that the at least one rib is in close proximity with the hook portion of the at least one wire retention feature; and
  d) inserting at least one wire into the at least one wire retention cavity by sliding the at least one wire underneath the hook portion of the at least one retention feature.

21. The method of claim 20, wherein, in the inserting step, the at least one wire retention feature pivots about the first side in order to allow the wire to slide underneath the hook portion.

22. The method of claim 21, further comprising the step of removing the wires from the at least one wire retention cavity by raising the at least one retention feature so that the retention feature pivots about the retention feature's base enough to allow the wires to be removed.

* * * * *